Figure 1:
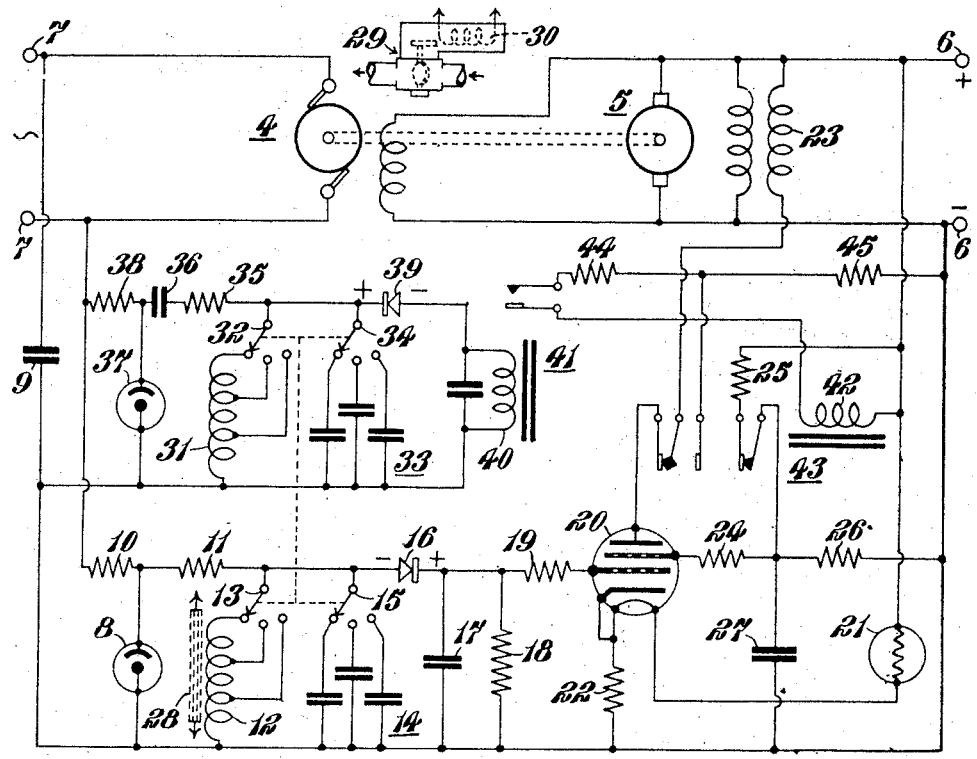

Inventors:
Paul Adorjan.
James E. Nash.
Ernest W. Rogers.
By Wm. J. Herdman
Attorney Patented Jan. 2, 1945

2,366,167

UNITED STATES PATENT OFFICE 2,366,167

CONTROLLING AUTOMATICALLY THE SPEED OF DYNAMOELECTRIC MACHINES

Paul Adorjan, Kingston Hill, James Emmanuel Nash, Beckenham, and Ernest William Rogers, Hayes, England Application February 12, 1943, Serial No. 475,630
In Great Britain December 24, 1941

4 Claims. (Cl. 171—312)

This invention is concerned with speed control systems for automatically maintaining the speed of a dynamo-electric generator within a predetermined range.

It is amongst the objects of the invention to provide a novel and efficient system of this kind for speed regulating a motor alternator adapted to produce currents of supersonic frequency, with the object of maintaining the frequency substantially constant during variations of load and/or driving power between fairly wide limits.

Another object of the invention is to provide a novel speed control system of this kind which includes means whereby operation at any one of a number of different speeds can be selected at will.

A further object of the invention is to provide such a speed control system which imposes an extremely small load upon the generator whilst rendering available a very substantial power for speed regulating purposes.

A still further object of the invention is to provide a speed control of this kind which incorporates means for guarding against excessive speed of the generator if for some reason the normal speed controlling arrangement becomes ineffective.

It is well known that in general the output of a dynamo-electric generator includes fluctuations which occur at a frequency that varies with the speed of the generator. In the case of an alternator there is the cyclic rise and fall of the output, whilst the output from a direct current generator will in most cases include fluctuations due to commutation. Such fluctuations of the output, whatever their origin, hereinafter will be referred to as ripple component.

Now according to one feature of the invention a speed control system for automatically maintaining the speed of a dynamo-electric generator within a predetermined range and wherein the output of said generator contains a ripple component having a frequency which varies with the speed of the generator, is characterised by the inclusion of means serving to obtain from the main output circuit of the generator a control voltage which is a function of the frequency of said ripple component but substantially independent of its amplitude over the said speed range, and utilise said control voltage for the purpose of regulating the speed of a driving means for the generator.

In accordance with another feature of the invention the desired control voltage is arranged to be a function of the frequency of the ripple component but substantially independent of the amplitude of said component above a predetermined value. Thus, a speed control system according to the invention can comprise means for levelling the peak amplitude of the ripple component obtained from an output of the generator over a predetermined speed range, and means for obtaining a control voltage which is a function of the frequency of the amplitude levelled ripple component, for the purpose of regulating the speed of the driving means for the generator.

Speed control systems according to the invention include means for differentiating between an increase and a decrease of the ripple frequency with respect to a predetermined ripple frequency which corresponds to the speed it is desired to maintain. In general a frequency discriminating circuit comprising appropriate inductive and capacitive elements will be employed for this purpose and the ripple component will be applied thereto. The value of the potentials developed across such a circuit will depend upon the frequency of the applied ripple component and will be used to obtain a control voltage which, directly or through the intermediary of suitable relay means, which latter may comprise one or more electronic discharge valve devices, can be used to regulate the speed of a driving means for the generator.

Briefly, one particular embodiment of the invention comprises a single resonant circuit tuned or tunable to a frequency slightly above or below that of the ripple component corresponding to the speed at which the generator is to be maintained. This circuit is coupled to the normal output terminations of the generator and a voltage limiter is used to level the peak amplitude of the ripple component so that the amplitude of the alternating potentials developed across the circuit will be solely dependent upon the ripple frequency. Consequently for the correct speed of the generator the alternating potentials will have a mean value. Assuming the circuit has been tuned to resonate slightly above the normal ripple frequency (that is to say the ripple frequency corresponding to the correct speed of the generator), then for a higher speed (higher ripple frequency) the alternating potentials across the circuit will be greater than the mean value and for a lower speed (lower ripple frequency) the alternating potentials across the circuit will be less than said mean value. These alternating potentials which are practically immune for variations of the output voltage over a considerable range, are applied to a rectifier and the resulting direct current employed to control the conductivity of an electronic discharge valve device. The anode circuit of this valve includes a winding which constitutes a supplementary field coil for a direct current motor by which the generator is driven. The energisation of this supplementary field coil is therefore made dependent upon the frequency of the ripple component and the arrangement is such that said coil is effective to counter any change in the speed of the motor. Consequently the system functions automatically to maintain the speed of the generator substantially constant.

Still further features of the invention will appear during the course of the description now to be given with reference to the accompanying drawing, which are presented merely by way of example and wherein—

Figure 2:
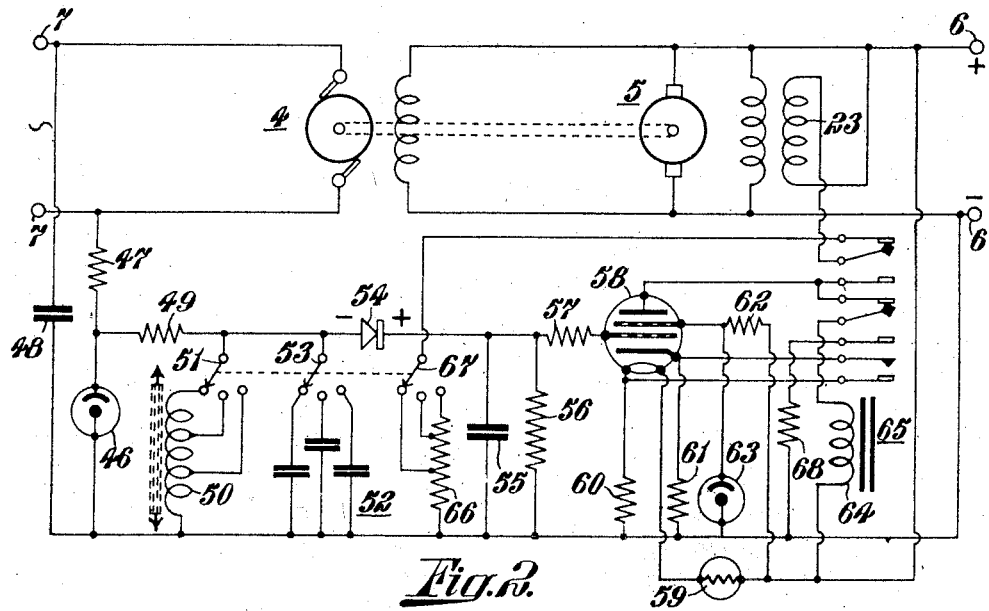

Fig. 1 shows diagrammatically a speed control system according to the invention and Fig. 2 shows in a similar manner a modified embodiment thereof.

In the arrangement shown in Fig. 1 an alternator 4 is driven by a direct current electric motor 5 adapted to be energised by connecting a suitable direct current supply to the input terminals 6. The output from the alternator is available across the terminations 7 and, for example, may consist of an alternating current of supersonic frequency, it being desired to maintain this frequency within very narrow limits of variation.

A neon tube 8 is connected across the output terminations 7 through a condenser 9 which serves to isolate the A. C. and D. C. circuits, and a resistor 10. This neon tube 8 functions as a voltage leveller so that for a considerable variation of the peak amplitude of the alternating current output there is available across the tube a ripple component of substantially constant peak amplitude. This levelled ripple component is applied through a resistor 11, to a frequency discriminating circuit comprising an inductance coil 12 with its tap-selector switch 13 and condensers 14 with associated selector switch 15. The switches 13 and 15 are ganged and enable the circuit to be tuned to resonate at any one of three predetermined frequencies.

The alternating potentials developed across the frequency discriminating circuit 12—14 are applied to a rectifier 16, for example a copper oxide or selenium plate type rectifier. The rectified output appearing across a condenser 17 and load resistor 18 is applied, in positive sense, through a resistor 19 to the control grid of a power tetrode valve 20.

The heater circuit of this valve 20 includes a barretter 21 and a resistor 22, the circuit being energised by direct current obtained by way of the input terminals 6. This barretter functions to maintain a current of constant value through the heater irrespective of considerable variation of the input voltage to the terminals 6, whilst the resistor 22 serves to bias the valve almost to "cut off."

Anode current supply for the valve 20 is also obtained from the input terminals 6, the anode circuit including an auxiliary field coil 23 of the motor 5. An appropriate screen grid potential is obtained by including in the feed circuit for the screen grid suitable resistors 24, 25, 26, the latter being shunted by a condenser 27.

The arrangement so far described is capable of maintaining the speed of the alternator 4 within a predetermined narrow range, for example such that for a 400% voltage change at the output of the alternator or a 30% voltage change at the D. C. input terminals, the speed of the alternator and consequently the frequency of the output thereof does not vary more than 0.1%. This regulation is obtained in the following manner. The speed (normal speed) it is desired to maintain is selected by setting the switches 13 and 15 to one of the three different positions, the electrical constants of the frequency discriminating circuit having been chosen to assure that said circuit resonates at a frequency slightly above that of the ripple frequency at this normal speed. Thus for normal speed the circuit will be operating at a point on the most linear part of the lower frequency skirt of its response curve and the alternating potentials developed across the circuit can be considered to have a mean value. Consequently for normal speed the positive potential applied to the control grid of the valve 20 will also have a mean value for which a certain flow of current will be obtained through the auxiliary field winding 23.

Now if for some reason, such as a variation of the load on the alternator 4 or a voltage change of the direct current input to the motor 5, the speed of the motor and alternator increases, the frequency of the ripple component applied to the circuit 12—14 will also increase and the circuit will be operating near its natural resonance. Therefore the alternating potentials developed across this circuit 12—14 will be greater than those for the normal speed and a higher positive potential will be applied to the control grid of valve 20. This in turn will increase the current flowing in the auxiliary field coil 23 with the result that the motor 5 will produce a lower driving torque and both the motor and the alternator will lose speed. In effect the control system increases the energisation of the auxiliary field coil to counteract the increase of speed.

If the speed of the motor and alternator decreases the frequency of the ripple component applied to the frequency discriminating circuit 12—14 will also decrease and the circuit will be operating at a lower point on the skirt of its response curve. Consequently the alternating potentials developed across this circuit will have a lower value than those corresponding to normal speed and a lower positive potential will be applied to the control grid of the valve 20. Therefore it will be obvious that less current will flow through the field coil 23 and the motor 5 will develop a higher driving torque which will cause both the motor and the alternator to gain speed. Thus in this case the control system decreases the energisation of the auxiliary field coil to counteract the decrease in speed.

By reason of the voltage limiting action of the neon tube 18 it will be appreciated that the control voltage applied to the control grid of the valve 20 will be practically immune from variation of the output voltage of the alternator and substantially solely dependent upon the frequency of the ripple component.

For the purpose of accurately tuning the frequency discriminating circuit, each of the condensers 14 can be made adjustable. In addition or alternatively a core element 28 for the inductance coil 12 can be made adjustable. Either of such adjustable tuning means can also be employed to give a vernier control of the speed of the motor and alternator, thus enabling the frequency of the alternator output to be very precisely adjusted.

Merely for the purpose of illustrating that the invention is not limited to the use of an electric motor drive for a dynamo-electric generator, there has been indicated at 29 a throttle valve adapted to control the flow of a driving fluid to an engine of any suitable kind. This throttle valve is actuated by electro-magnetic means which include a coil 30 adapted to replace the auxiliary field coil 23 when such an engine is employed instead of the electric motor.

It readily will be understood that the throttle valve will assume a mean position corresponding to normal speed and that a rise or fall of the current through the coil 30 as the speed increases or decreases respectively, can be made to close or open the valve by an amount sufficient to counteract such a change of speed.

It has been found in practice that although such a speed control system performs admirably when once the control circuit has become stabilised, there is nevertheless the possibility that failure of some component of the system may render the control ineffective and the motor and generator may reach an undesirably high speed. Furthermore when starting the system, the valve 20 may not have warmed up sufficiently by the time the alternator has reached the normal speed and consequently satisfactory control cannot be established. To obviate the disadvantages of such possibilities there is provided, in accordance with another feature of the invention, a guard circuit which comes into operation when the speed reaches a predetermined high value to at least prevent any further increase of the speed.

Such a guard circuit is shown in Fig. 1 and comprises a frequency selective circuit consisting of an inductance coil 31 with tap-selector switch 32, condensers 33 and selector switch 34. The switches 32 and 34 are ganged to operate in unison with the switches 13 and 15 and enable the circuits 31—33 to be tuned to resonate at any one of three predetermined frequencies. Each of these predetermined frequencies is slightly higher than the resonance frequency of the corresponding frequency discriminating circuit selected by the said switches 13 and 15. This frequency selective circuit 31—33 is connected, through a resistor 35 and condenser 36, across a neon tube 37 which is itself connected, through a resistor 38 and the condenser 9, across the output terminations of the alternator 4. The neon tube 37 functions as a voltage leveller so that the ripple component applied to the frequency selective circuit has a substantially constant peak amplitude irrespective of large voltage variations of the alternator output.

The alternating potentials developed across the frequency selective circuit are applied to a rectifier 39, which conveniently can be a copper oxide or selenium plate type rectifier, and the resultant D. C. current passed through a winding 40 of an electro-magnetic relay 41. The single pair of contacts of this relay 41 control the energisation of a winding 42 of another electromagnetic relay 43, which latter actuates one set of make-and-break contacts and one set of single pole changeover contacts. All these contacts are shown in the position corresponding to the unenergised condition of the respective relay windings.

The operation of the guard circuit is as follows: Let it be assumed that the system has just been energised and the valve 20 is starting from cold. The motor 5 and the alternator 4 will gather speed until the selected normal speed is reached, at which time the positive potential being applied to the control grid of the valve will be such as should produce the appropriate mean value of current through the auxiliary field coil 23. This appropriate mean value of current will only be produced if the valve 20 has fully warmed up and attained its normal operating condition, in which case the control system will function as hereinbefore described to counteract any subsequent increase or decrease of speed.

However, if this normal operating condition has not been attained then the motor and the alternator will continue to gather speed and, unless checked by the subnormal but nevertheless increasing counteraction of the auxiliary field coil 23 as the ripple frequency approaches the resonant frequency of the circuit 12—14, will eventually reach a speed for which the ripple frequency approaches the resonance frequency of the frequency selective circuit 31—33. As this occurs there is a marked increase in the amplitude of the alternating potentials applied to the rectifier 39 and therefore a greater flow of current through the winding 40. As a result the relay 41 operates and the closing of its contacts energises the winding 42 through resistances 44 and 45. The resulting operation of the relay 43 and the changeover of one set of its contacts serves to open the anode circuit of the valve 20 and put the auxiliary field coil in series with the resistor 45, across the D. C. input terminals 6. The other set of contacts of this relay 43 are opened at the same time and thus remove the positive potential from the screen grid of the valve 20 in order to avoid damaging the latter in the absence of the anode potential.

The resistor 45 passes considerably more current than the valve 20 and therefore the auxiliary field coil 23 is now very strongly energised and functions to slow down the motor. This abnormal energisation of the auxiliary field coil will be maintained until the ripple frequency has fallen well below the resonance frequency of the circuit 31—33 and the consequent reduction of current through the winding 40 has caused the relay 41 and in turn the relay 43 to release. By arranging for either or both of these relays to be sufficiently slow releasing, it can be assured that the speed of the motor and alternator at the time of such release is substantially normal or probably well below this normal speed.

Thus, immediately the relays have released, the auxiliary field coil will again enter the anode circuit of the valve 20 and, assuming the said valve has now reached its normal operating condition, will assume its normal controlling function. If the normal operating condition does still not exist, then the cycle of operation of the guard circuit will be repeated. Continual failure of the system to assume normal control will serve to indicate a fault and steps can then be taken to locate and remedy such fault. Likewise, if the control system has been functioning in a normal manner and develops a fault the guard circuit will come into operation to limit the speed of the motor and alternator.

Although the operation of the system has been described for the condition where the frequency discriminating circuit is tuned to resonate at a frequency slightly above the normal ripple frequency, it is also possible to operate the system with the said circuit tuned to resonate slightly below the normal ripple frequency. In this case an increase of speed will serve to reduce the current through the auxiliary field coil 23, whereas a decrease of speed will increase the current through this coil. It is thus necessary to reverse the effect of the auxiliary field coil and this can be done merely by changing over its connections.

Another arrangement according to the invention, and incidentally one which functions according to the abovementioned modified mode of operation, is shown in Fig. 2. The motor, the alternator and the input and output arrangements can, merely by way of example, be considered the same as those of Fig. 1 and are given similar reference numerals.

In common with the system hereinbefore described a neon tube is employed to level the peak amplitude of the ripple component. This tube is shown at 46 and is connected to the output terminations of the alternator 4 through a resistor 47 and D. C. isolating condenser 48. The levelled ripple component is applied through a resistor 49 to a frequency discriminating circuit comprising an inductance coil 50 with its tap-selector switch 51 and condensers 52 with associated selector switch 53. These switches 52 and 53 are ganged and enable the circuit to be tuned to resonate at any one of three predetermined frequencies.

A rectifier 54 is subject to the alternating potentials developed across the circuit 50—52 and the D. C. output therefrom, available across a condenser 55 and resistor 56, is applied through a resistor 57 to the control grid of a power tetrode valve 58.

The heater of this valve is energised from the D. C. input terminals 6 and the heater circuit includes a barretter 59 and resistor 60. The barretter serves to maintain a current of substantially constant value through the heater irrespective of considerable variation of the input voltage. A resistor 61 connects the cathode of this valve to the negative side of the resistor 60.

A suitable screen grid potential is applied through a resistor 62 and is maintained substantially constant by means of a neon tube 63, whilst the anode circuit initially includes a winding 64 of an electro-magnetic relay 65 comprising a set of make-and-break contacts and two sets of single pole changeover contacts.

The auxiliary field coil 23 of the motor 5, in series with at least a portion of a tapped resistor 66, is initially connected across the D. C. input terminations, the tappings of said resistor being connected to the studs of a selector switch 67 that is ganged with the switches 51 and 53.

The operation of this modified embodiment of the invention is as follows:

The electrical constants of the frequency discriminating circuit 50—52 are chosen to assure that for each of the three possible normal speeds, which are adapted to be selected by the switches 51 and 53, said circuit resonates at a frequency slightly lower than the ripple frequency corresponding to this speed. Thus for normal speed the circuit will be operating at a point on the most linear part of the higher frequency skirt of its response curve and the alternating potentials developed across the circuit can be considered to have a mean value. Therefore a speed above the normal will reduce the positive potential on the control grid of the valve 58 from a mean value, whilst a speed lower than normal will raise this potential above the mean value. The tapping points on the resistor 66 are chosen to assure that for the respective different normal speeds the flow of current through the auxiliary field coil 23 is such that the motor and alternator will initially attain a speed above the selected normal speed.

Assuming that the system has just been energised and the valve 58 is starting from cold, then the motor 5 and alternator 4 will accelerate to a speed higher than the selected normal speed. During this period of acceleration the valve 58 has been warming up and has commenced or will eventually commence to pass anode current. The cathode resistor 61 will apply automatic bias to limit the flow of anode current and this resistor and the relay 65 are chosen so that only when the valve has reached a reasonably steady operating condition, will the anode current be sufficient to operate the relay. Thus there is no possibility of bringing the valve into service prematurely.

When the anode current operates the relay 65 the make-and-break contacts close to interconnect the positive sides of the resistors 60 and 61 so that the effective negative bias on the control grid is reduced. At the same time one set of the changeover contacts serves to disconnect the auxiliary field coil 23 from the resistor 66 and connect it in the anode circuit of the valve so that it is now traversed by the anode current. Simultaneously the other set of changeover contacts serves to disconnect the winding 64 of the relay 65 from the anode circuit, and, in series with a resistor 68 connects this winding across the D. C. input terminals 6; thus the relay is held in operated condition.

The resultant reduction of the current through the auxiliary field coil will lower the speed of the motor and alternator until the desired normal speed is reached, for which condition the positive potential being applied to the control grid and the correspondingly flow of anode current through the field coil will have a mean value.

Any subsequent change of speed will either increase or decrease the positive potential being applied to the control grid as the ripple frequency approaches nearer to or departs further from the resonant frequency of the circuit 50—52, and the consequent increase or decrease of the current flowing through the auxiliary coil will counteract this change of speed. It therefore will be appreciated that the system will function to maintain the speed of the alternator and consequently the frequency of its output within narrow limits of variation.

It is of course to be understood that the invention is not limited to the use of the particular components described with reference to the accompanying drawing and that equivalent alternatives can in most cases be devised and utilised without departing from the scope of the appended claims.

What we claim is:

1. A speed control system for automatically maintaining the speed of a dynamo-electric generator within a predetermined range and wherein an output of said generator contains a ripple component having a frequency which varies with the speed of the generator, comprising means for levelling the peak amplitude of the ripple component applied thereto over the said speed range, a circuit tuned or tunable to a frequency slightly above or below that of the ripple component at the speed it is desired to maintain, means for applying the levelled ripple component to said circuit, means for rectifying the alternating potentials developed across said circuit, an electron discharge valve device, means serving to apply the rectified potential to a control electrode of said valve device, an electric motor for driving the said generator, an auxiliary field coil on said motor, and means whereby said coil is energised according to the flow of anode current through said valve device.

2. A speed control system for automatically maintaining the speed of a dynamo-electric generator within any one of a number of predetermined different speed ranges and wherein the output of said generator contains a ripple component having a frequency which varies with the speed of the generator, comprising means for levelling the peak amplitude of said ripple component applied thereto over the said speed range, means whereby a plurality of resonant circuits can be formed, each of said circuits being tuned or tunable to a frequency slightly above or below that of the ripple component corresponding to one of the different speeds it is desired to maintain, means for selecting any one of said resonant circuit arrangements, means for applying the levelled ripple component to the selected resonant circuit, means for rectifying the alternating potentials developed across this resonant circuit, an electron discharge valve device, means serving to apply the rectified potential to a control electrode of said valve device, an electric motor for driving the said generator, an auxiliary field coil on said motor, and means whereby said coil is energised according to the flow of anode current through said valve device.

3. A speed control system for automatically maintaining the speed of a dynamo-electric generator within a predetermined range and wherein the output of said generator contains a ripple component having a frequency which varies with the speed of the generator, comprising driving means for said generator, means for levelling the peak amplitude of said ripple component over the said speed range, means for discriminating between an increase and decrease of the frequency of said ripple component, means for obtaining from said frequency discriminating means a control voltage which is a function of the frequency of the amplitude levelled ripple component and means for utilizing said control voltage to regulate the speed of said driving means.

4. A speed control system for automatically maintaining the speed of a dynamo-electric generator within a predetermined range and wherein the output of said generator contains a ripple component having a frequency which varies with the speed of the generator, comprising driving means for said generator, means for levelling the peak amplitude of said ripple component over the said speed range, means for discriminating between an increase and decrease of the frequency of said ripple component, means for obtaining from said frequency discriminating means a control voltage which is a function of the frequency of the amplitude levelled ripple component but substantially independent of its amplitude over the said speed range and means for utilizing said control voltage to regulate the speed of said driving means, said means including a device which requires time to reach its normal operating condition and means responsive to a change of the ripple frequency for preventing said device being put into normal service until it has attained such normal operating condition.

PAUL ADORJAN.
JAMES EMMANUEL NASH.
ERNEST WILLIAM ROGERS.